US012608685B2

(12) United States Patent
Heggebø et al.

(10) Patent No.: US 12,608,685 B2
(45) Date of Patent: Apr. 21, 2026

(54) SYSTEM AND METHOD FOR CONDITION BASED MAINTENANCE

(71) Applicant: Autostore Technology AS, Nedre Vats (NO)

(72) Inventors: Jørgen Djuve Heggebø, Olen (NO); Ingvar Fagerland, Kolnes (NO); Dag Arne Matre, Sandeid (NO)

(73) Assignee: AutoStore Technology AS, Nedre Vats (NO)

( * ) Notice: Subject to any disclaimer, the term of this patent is extended or adjusted under 35 U.S.C. 154(b) by 722 days.

(21) Appl. No.: 17/906,961

(22) PCT Filed: Mar. 26, 2021

(86) PCT No.: PCT/EP2021/057981
§ 371 (c)(1),
(2) Date: Sep. 21, 2022

(87) PCT Pub. No.: WO2021/198093
PCT Pub. Date: Oct. 7, 2021

(65) Prior Publication Data
US 2023/0142454 A1      May 11, 2023

(30) Foreign Application Priority Data

Mar. 31, 2020     (NO) ................................... 20200386

(51) Int. Cl.
*G06Q 10/20*        (2023.01)
*B65G 1/04*        (2006.01)
(Continued)

(52) U.S. Cl.
CPC ........... *G06Q 10/20* (2013.01); *B65G 1/0464* (2013.01); *B65G 1/0478* (2013.01); *B65G 1/065* (2013.01);
(Continued)

(58) Field of Classification Search
CPC ........ G06Q 10/20; G06Q 10/04; G06Q 10/08; B65G 1/0464; B65G 1/0478; B65G 1/065;
(Continued)

(56) References Cited

U.S. PATENT DOCUMENTS

2014/0207726 A1     7/2014   Kamenka et al.
2018/0075402 A1*    3/2018   Stadie .............. G05B 19/41895
(Continued)

FOREIGN PATENT DOCUMENTS

CN        105469147 A      4/2016
CN        108510221 A      9/2018
(Continued)

OTHER PUBLICATIONS

Le Huy Anh, Office Action for Vietnamese Patent Application No. VN1-2022-07017, dated Oct. 10, 2024, 4 pages, pub. by Intellectual Property Office of Vietnam, Hanoi, Vietnam.
(Continued)

*Primary Examiner* — Thomas Randazzo
(74) *Attorney, Agent, or Firm* — Baker Botts L.L.P.

(57)        ABSTRACT

A system for condition-based maintenance of an automated storage and retrieval system includes a framework structure with a rail system forming a three-dimensional storage grid structure for storing storage containers for storing items. The grid structure forms vertical storage columns each having a horizontal area defined by the size of an access opening between rails of the rail system that are arranged on the framework structure. The rail system provides available routes for container handling vehicles handling and transferring the storage containers to and from the storage columns. At least one container handling vehicle which has a container handling platform with a set of grippers for
(Continued)

handling the storage containers. The grid structure includes one or more ports for extracting containers from the storage grid so that the storage containers can be picked and a service station for performing maintenance on the components of the storage and retrieval system. The system further includes a plurality of sensors configured to be attached to components of the storage and retrieval system for providing condition-based information linked to parts and components of the storage and retrieval system, a service regime manager configured to retrieve condition-based information from the plurality of sensors and create a service regime based on the condition-based information linked to parts and components of the storage and retrieval system and send the service regime to a local service station where condition-based maintenance is performed, and a central computer system. The central computer system is configured to: receive the condition-based information from the plurality of sensors and decide what information is to be sent to a global computer system that is part of the system for condition-based maintenance, and further sending only the information that can be of interest to other storage and retrieval systems. The global computer system is configured to receive the condition-based information from the central computer system and determine trends regarding component servicing or changing of components and further the global computer system transfers the information on the trend to the individual central computer system's service regime manager.

14 Claims, 4 Drawing Sheets

(51) Int. Cl.
B65G 1/06 (2006.01)
B65G 1/137 (2006.01)
G06Q 10/04 (2023.01)

(52) U.S. Cl.
CPC ......... B65G 1/1371 (2013.01); B65G 1/1375 (2013.01); G06Q 10/04 (2013.01); B65G 1/1378 (2013.01)

(58) Field of Classification Search
CPC .. B65G 1/1371; B65G 1/1375; B65G 1/1378; B65G 2201/0235
See application file for complete search history.

(56) References Cited

U.S. PATENT DOCUMENTS

| | | | |
|---|---|---|---|
| 2018/0194571 A1 | 7/2018 | Fryer et al. | |
| 2018/0237221 A1* | 8/2018 | Lindbo | E04B 1/94 |
| 2019/0232925 A1* | 8/2019 | Hognaland | B60L 53/80 |
| 2019/0263589 A1* | 8/2019 | Clarke | B65G 57/03 |
| 2020/0012268 A1* | 1/2020 | Stadie | G05D 1/0255 |
| 2020/0262074 A1* | 8/2020 | Proulx | B25J 19/023 |
| 2021/0048818 A1* | 2/2021 | Funke | G05D 1/617 |
| 2021/0291785 A1* | 9/2021 | Basu | B60R 25/2018 |
| 2022/0135324 A1* | 5/2022 | Whelan | B65G 1/0464 414/266 |

FOREIGN PATENT DOCUMENTS

| | | | | |
|---|---|---|---|---|
| DE | 102014114202 A1 * | 3/2016 | ............. | G06Q 10/04 |
| EP | 3355255 A1 * | 8/2018 | ............. | B60L 58/12 |
| JP | 2002109094 A | 4/2002 | | |
| JP | 2010257363 A | 11/2010 | | |
| NO | 317366 B1 | 10/2004 | | |
| WO | 2014075937 A1 | 5/2014 | | |
| WO | 2014090684 A1 | 6/2014 | | |
| WO | 2015193278 A1 | 12/2015 | | |
| WO | 2018050816 A1 | 3/2018 | | |
| WO | 2018146304 A1 | 8/2018 | | |
| WO | 2019068778 A1 | 4/2019 | | |
| WO | 2019216975 A1 | 11/2019 | | |
| WO | 2019238697 A1 | 12/2019 | | |
| WO | 2019238702 A1 | 12/2019 | | |

OTHER PUBLICATIONS

Haiyang Zhou, First Office Action for Chinese Patent Application No. 202180026235.6, dated Jan. 24, 2025, 9 pages, pub. by SIPO, Beijing, China.
Palais, Brieux, Office Action for European Patent Application No. 21716641.2, dated Feb. 25, 2025, 6 pages, pub. by the EPO, Rijswijk Netherlands.
A. Szabo "Introduction to Condition-based Maintenance (17970)" United Nations: Industrial Development Organization; Dec. 31, 1989 (136 pages).
A. K. O. Håvås "Model to develop cost effective preventive maintenance program for material handling robot in intelligent warehousing system: A case study in Autostore AS" Master Thesis; University of Stravanger; Jun. 14, 2018 (84 pages).
S. Wenzel et al. "Condition Monitoring in Logistics—A New Approach for Maintenance" International Institute of Informatics and Systemics; Jun. 14, 2011 (6 pages).
E. A. Ulimoen "Automation Scandinavia 2016: Condition Monitoring and Condition Based Maintenance" ABB Oil Gas and Chemicals Norway; Apr. 5, 2016 (17 pages).
ABB "Une logistique sophistiquée pour les petites pièces" ABB Magazine; Oct. 24, 2015 (2 pages).
Search Report issued in Norwegian Application No. 20200386; Dated Sep. 7, 2020 (2 pages).
International Search Report issued in International Application No. PCT/EP2021/057981, mailed Jul. 14, 2021 (5 pages).
Written Opinion issued in International Application No. PCT/EP2021/057981; Dated Jul. 14, 2021 (9 pages).
International Preliminary Report on Patentability issued in International Application No. PCT/EP2021/057981; mailed Jun. 24, 2022 (26 pages).
Otsuka, Takako, Office Action in JP2022559371, mailed Apr. 30, 2025, 17 pages, Japan Patent Office, Tokyo, Japan.
Zhou, Haiyang, Office Action in CN202180026235.6, mailed Jun. 25, 2025, 23 pages, The State Intellectual Property Office of the People's Republic of China, Beijing, China.
Anonymous, Office Action in KR1020227037344, mailed Nov. 17, 2025, 23 pages, Korean Intellectual Property Office, Daejeon, Korea.
Zhou, Haiyang, Office Action in CN202180026235.6, mailed Nov. 4, 2025, 21 pages, The State Intellectual Property Office of the People's Republic of China, Beijing, China.
Zhou, Haiyang, Office Action in CN202180026235.6, mailed Feb. 4, 2026, 22 pages, The State Intellectual Property Office of the People's Republic of China, Beijing, China.

* cited by examiner

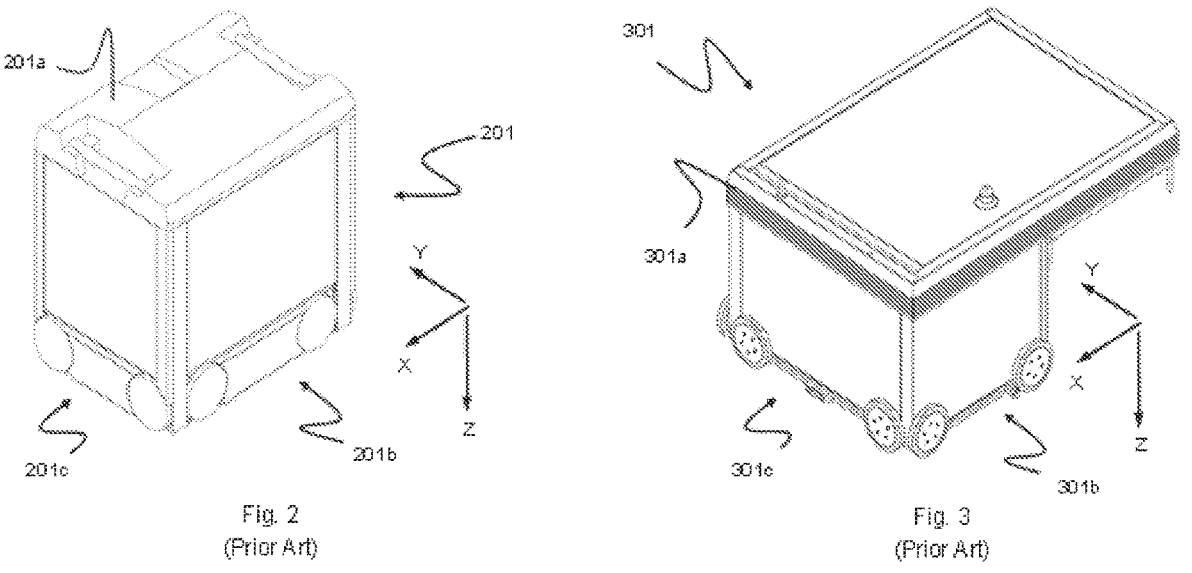
Fig. 2
(Prior Art)
Fig. 3
(Prior Art)
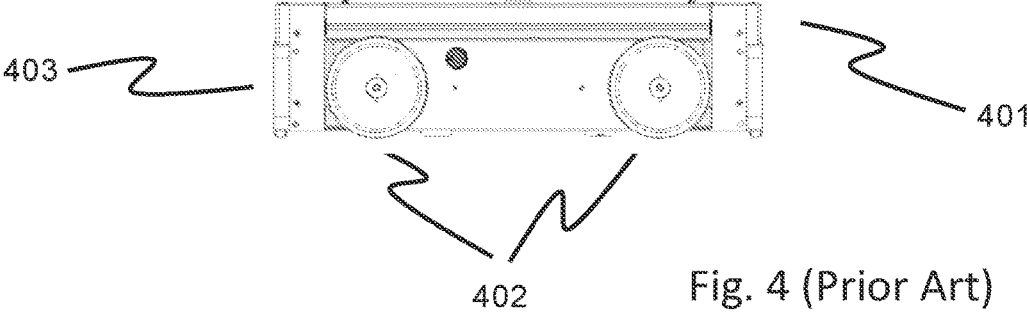
Fig. 4 (Prior Art)

SYSTEM AND METHOD FOR CONDITION BASED MAINTENANCE

FIELD OF THE INVENTION

The present invention relates to an automated storage and retrieval system for storage and retrieval of containers, in particular to a system and method for an intelligent maintenance system wherein the intelligent maintenance system uses condition-based maintenance of the parts of the system.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 ... n and Y=1 ... n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

WO 2019/238702 discloses an automated storage and retrieval system comprising a framework structure with a rail system forming a three-dimensional storage grid for storing containers for storing items, where the grid structure forms vertical storage columns each having a horizontal area defined by the size of an access opening between the rails of the rail system that are arranged on the framework structure, the rail system providing available routes for container handling vehicles handling and transferring the storage containers to and from the storage columns and at least one container handling vehicle.

US 2014/207726 represent describes a system for recommending maintenance of helicopter engines depending on the technical condition of the engine, the standard replacement of parts between engines, and the replacement of parts with different parts.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

A problem with present solutions is that if e.g. a container handling vehicle breaks down while it is performing a task on the grid, it causes a huge problem since the entire grid has to be closed down while the container handling vehicle is being serviced. This is the same for all the different parts of the storage system. If a part or a component of the storage system breaks down, the consequences is large for the entire systems since it causes delays in the operation of the storage system. And if you have a storage system with many hundred container handling vehicles, a stop in operation of an hour is a lot of money lost.

It is therefore an object of the present invention to solve the problems mentioned above.

SUMMARY OF THE INVENTION

The present invention is set forth and characterized in the independent claims, while the dependent claims describe other characteristics of the invention.

In one aspect, the invention provides a system for condition-based maintenance of an automated storage and retrieval system comprising a framework structure with a rail system forming a three-dimensional storage grid structure for storing storage containers for storing items, where the grid structure forms vertical storage columns each having a horizontal area defined by the size of an access opening between rails of the rail system that are arranged on the framework structure, the rail system providing available routes for container handling vehicles handling and transferring the storage containers to and from the storage columns, at least one container handling vehicle which has a container handling platform with a set of grippers for handling the storage containers, the grid structure comprising one or more ports for extracting containers from the storage grid so that they can be picked and a service station for performing maintenance on the components of the storage and retrieval system and wherein the system further comprises a central computer system and a service regime manager configured to retrieve condition-based information linked to parts and components of the storage and retrieval system and to analyse and create a service regime based on the retrieved condition-based information and to send the service regime to the service station.

Thus, a solution to the object above is to gather as much information as possible about the conditions of the different parts of the systems as possible and use this information to predict when there is a need for a service or other maintenance. If the parts and components of the system is repaired and maintained on a regular basis, the storage system does not need to be shut down either in part or completely due to robots that breaks down and there is a significantly lower financial loss. The system therefore needs to gather information from many different sources, both by continuous surveillance but also by gathering information regarding each component of the system and/or from many different sources.

Also, the system comprises a global computer system is configured to collect information from the central computer systems of each individual storage and retrieval system, the production and testing facilities and the service distributers and analyse and send relevant information back to the central computer systems of each individual storage and retrieval system.

Thus further, the storage system may comprise sensors attached to components for providing the condition-based information. The sensors may comprise temperature and/or humidity sensors. The sensors may comprise load sensors. The sensors may comprise movement sensors.

The service centre may be configured to record and store a data record if a component breaks down, where the data record comprises information relating to the component, its service time and/or age.

Also, a container handling vehicle with a worn component may be told to adapt its speed, acceleration and deceleration to suit the components condition by the central computer system. For example, it may be told to reduce its top speed, reduce its average speed, to reduce its acceleration and/or reduce its deceleration. The container handling platform on the container handling vehicle has sensors for detecting if a storage container experiences significant resistance or gets stuck in a storage container column of the storage system. Location details of where a container handling vehicle has encountered increased resistance or sticking in a storage column may be fed back to the central computer system and/or to the service regime manager.

The at least one container handling vehicle may have at least one rechargeable power source. The automated storage and retrieval system may comprise at least one charging device for charging the rechargeable power sources of the container handling vehicles.

A second aspect the invention is directed to a method for condition-based maintenance of an automated storage and retrieval system comprising a framework structure with a rail structure forming a three-dimensional storage grid structure for storing storage containers for storing items, where the grid structure forms vertical storage columns each having a horizontal area defined by the size of an access opening between rails of the rail system that are arranged on the framework, the rail system providing available routes for container handling vehicles handling and transferring the storage containers to and from the storage columns, at least one container handling vehicle which has a container handling platform with a set of grippers for handling the storage containers, the grid structure comprising one or more ports for extracting containers from the storage grid so that they can be picked and a service station for performing maintenance on the components of the storage and retrieval system and wherein the method comprises the following steps: monitoring the condition of components of the storage and retrieval system, sending information regarding the condition of components of the storage and retrieval system to a central computer system, using a service regime manager, to analyse the information regarding the condition of components of the storage and retrieval system, creating a service regime based on the analysed information regarding the condition of components of the storage and retrieval system, sending the service regime to at least one service station where condition-based maintenance is performed.

Further the method may comprise gathering information from sensors monitoring the components of the storage and retrieval system. The information from the sensors may comprise a registration of the problem with the component of the storage and retrieval system together with information regarding its service time and age.

Also, the method may comprise allocating a container handling vehicle that has a worn component to do less demanding tasks on a task list. The container handling vehicle may be instructed to adapt speed, acceleration and/or deceleration of a container handling vehicle with a worn component to suit the worn component's condition. For example, it may be told to reduce its top speed, reduce its average speed, to reduce its acceleration and/or reduce its deceleration.

Also, in embodiments having sensors attached to gripper elements on a container handling platform of a container handling vehicle for detecting when a storage container meets significant resistance or gets stuck in a storage container column of the storage and retrieval system, information regarding the location of where the storage container encountered significant resistance or became stuck can be fed back to the central computer system and/or to the service regime manager. Information from the production and testing facilities can be updated and sent to the central computer system. Information from the service distributers can be updated and sent it to the central computer system.

By doing this the present invention, at least in the preferred embodiments, describes a system wherein information is gathered in from many different resources and the information is used to create a service regime with the sole intent to prevent unintentional break downs of material and components of the different parts of the storage and retrieval system.

The intent here is to be preventive and maximize the usefulness of all the components with a minimum of risk. The solution is to catch the problems before they get big.

BRIEF DESCRIPTION OF THE DRAWINGS

Following drawings are appended to facilitate the understanding of the invention. The drawings show embodiments of the invention, which will now be described by way of example only, where:

FIG. 2 is a perspective view of a prior art container handling vehicle having a centrally arranged cavity for carrying storage containers therein.

FIG. 3 is a perspective view of a prior art container handling vehicle having a cantilever for carrying storage containers underneath.

FIG. 4 is a perspective view of a prior art container handling vehicle in the form of a container handling vehicle, wherein the container handling vehicle can carry a container on top.

DETAILED DESCRIPTION OF THE INVENTION

Figure 1:
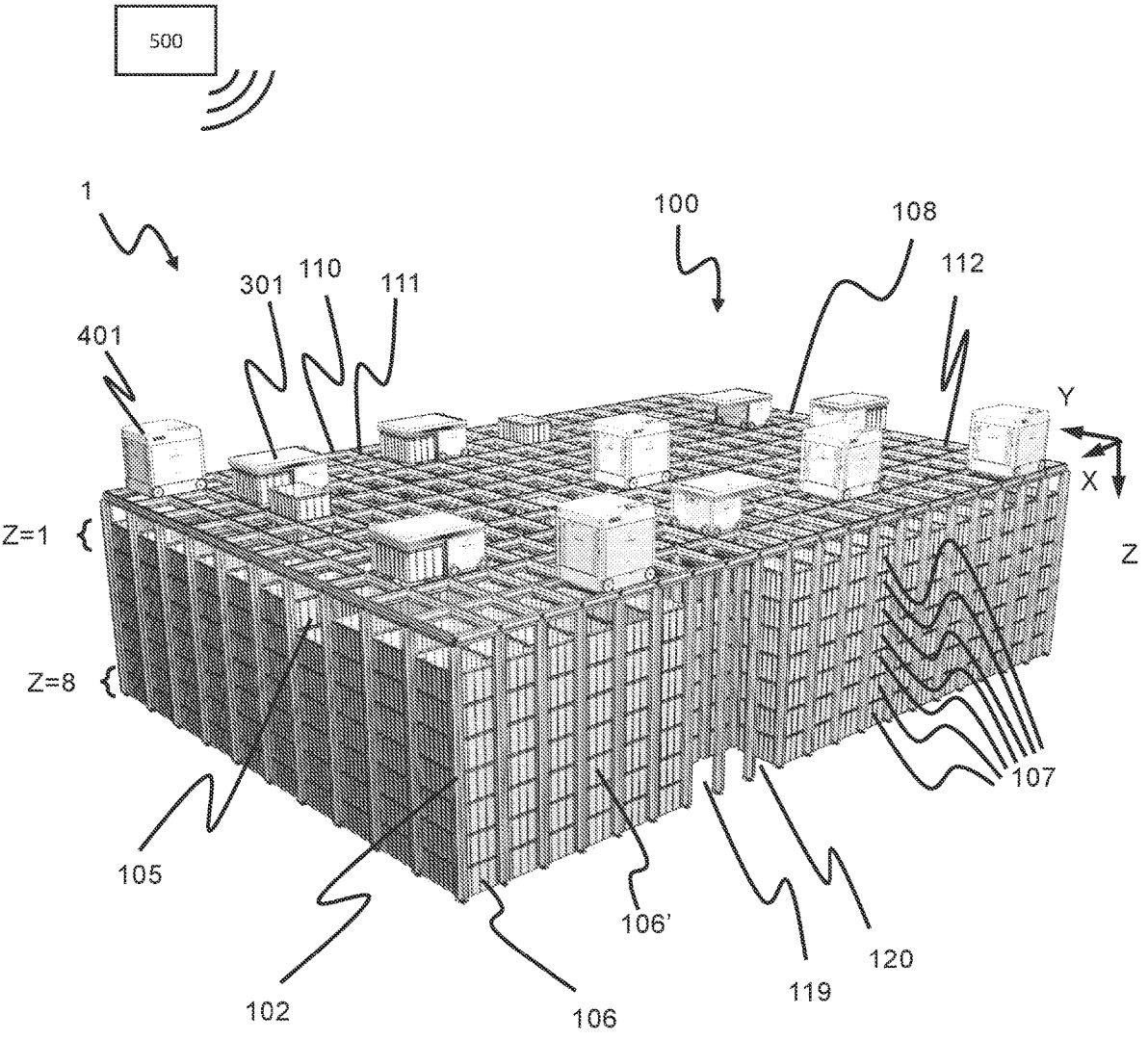
FIG. 1 is a perspective view of a three-dimensional storage grid structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework structure (100) with a rail system forming a three-dimensional storage grid structure (104) of the automated storage and retrieval system 1 is constructed in accordance with the prior art framework structure 100 described above in connection with FIGS. 1-4, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

In FIGS. 2-4 it is shown different container handling vehicles, in FIG. 2 it is shown a container handling vehicle with a central cavity solution. Here the container is carried in a central cavity in the container handling vehicle.

In FIG. 3 it is shown a container handling vehicle with a cantilever solution. Here the container is carried by a lifting frame situated adjacent to the main body of container handling vehicle.

In FIG. 4 it is shown a container handling vehicle in the form of a delivery vehicle, which is a container handling vehicle where the containers are carried on top of the delivery vehicle.

All the vehicles have 8 wheels, four for moving the vehicle in an X-direction and four for moving the vehicle in a Y-direction.

Figure 5:
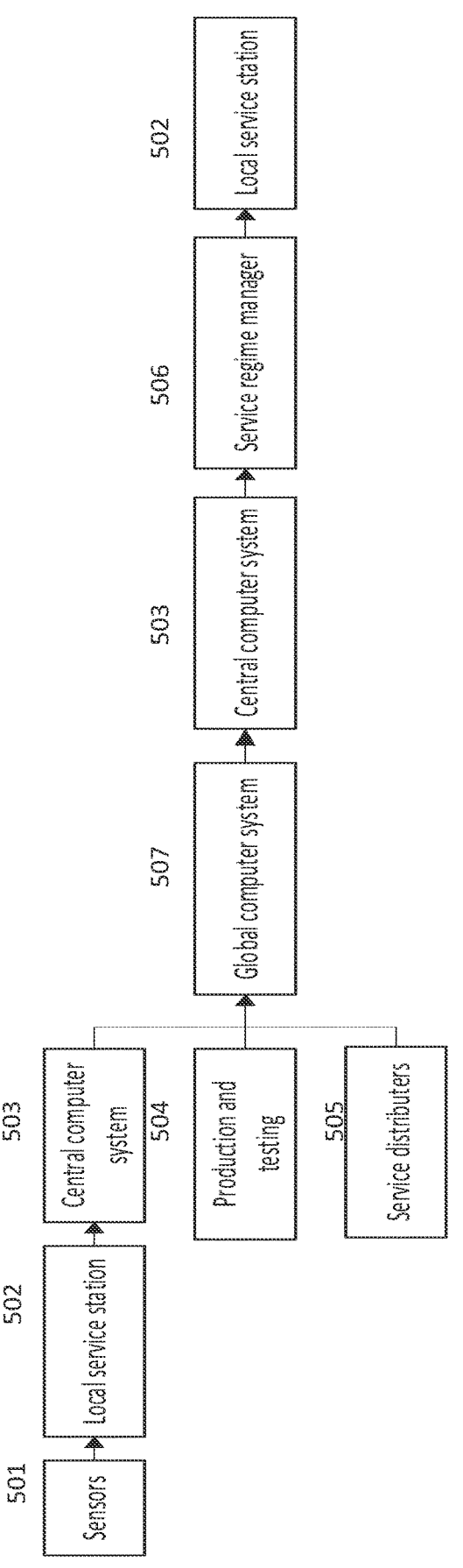
FIG. 5 is a box diagram of an embodiment of the system wherein the active parts of the system are displayed and how they work together.

FIG. 5 is a box diagram of an embodiment of the present invention where active parts of the system are displayed, and it is shown how they are connected.

The storage and retrieval system in its entirety is comprised of a plurality of different parts and components that work together to operate the system. Some of these parts and components are subject to wear and tear due to them either being moving parts or they are subjected to either strain or temperature changes. Examples of such parts or components are movable parts on the container handling vehicles, like the wheels and the parts that lift and control the movement of the wheels. Also, components in the lifting platforms of the container handling vehicles.

Further there can be sensors 501 attached to the moving parts of the ports and picking stations where the container handling vehicles delivers the containers and the items in the containers are picked for further distribution. Also, sensors 501 can be provided in barriers separating different storage grids from each other and parts of the storage grids from other parts of the storage grids, sensors 501 being for monitoring the state of the components.

To keep track of the state of the component or part, sensors 501 can be placed on them or in connection with them in order to register if the part or component shows signs of deterioration. If the part or component shows signs of deterioration the sensor registers the information and transmits it onwards to either a local service system or a central computer system 503 that can decide what to do in this situation.

Examples of sensors 501 that can be used are temperature sensors 501 that can measure the temperature of the component in order to check if there is unusual generation of heat from the component. Also, there can be an accelerometer attached to components in order to check if there is any unusual movement in the component. Unusual movement can be e.g. that the component is shaking. The energy consumption of a part of the system can also be monitored. A higher energy consumption than normal can be a signal that something is wrong with a component. Sensors 501 can also be microphones that measures the sound a part or component is emitting. Also, the speed the part or component is operating with can be measured by a sensor.

In an embodiment of the present invention, the sensors 501 send their information to a service station 502, for example, a local service station which is on site and connected with the rail system. The local service station 502 can be where all the maintenance of the system is managed and the information regarding the condition of the parts and components is stored. The stored information can be the information transmitted from the sensors 501, and it can also be information gathered during repairs done on the storage and retrieval system. The local service station 502 stores the information and keeps track of the wear and tear of the components. The local service station 502 communicates the gathered information to the central computer system 503. This embodiment has a service and maintenance computer system that is separate from the central computer system 503 and is managed from the local service station 502.

In an alternative embodiment of the present invention all the information transmitted from the sensors 501 can be transmitted to the central computer system 503. In this solution the central computer system 503 gathers all the information from that storage and retrieval system and keeps track of all the maintenance that needs to be done along with the condition of the components and parts of the storage and retrieval system. In this embodiment the entire service and maintenance system is part of the central computer system 503.

Condition-based information is information gathered from the sensors 501 monitoring the components and parts of the at least one storage and retrieval system. Further it contains information gathered from service providers regarding the wear and tear they see on the components of the system. Also, condition-based information is the information gathered from a production and testing 504 department. This information can be design or production flaws discovered on components and parts during testing and trails of the equipment. An example of such information can be problems with a batch of circuit boards or similar. This information can be distributed to storage and retrieval systems that use that particular part or component and a service regime manager 506 can take this information into consideration when it is making the service regime.

The central computer system 503 decides what information to send on to the global computer system 507. Information that can be of interest to other storage and retrieval systems can be transferred to the global computer system 507, while information that describes malfunctions that is due to happenings or conditions that is particular to the specific storage and retrieval system may not transmitted to the global computer system 507. Information that is usually not transmitted can be damage to parts or components on container handling vehicles that is due to collisions, or it can be damage that is due to human errors. By contrast, the information that is transmitted to the global computer system 507 is information that can help other storage and retrieval systems to develop service regimes that can anticipate the service on parts and components that are of interest. Examples of information of interest is a record of the age of a component, the service time of a component, the conditions it has been operating in and transmit this information when the component starts to show signs of wear and tear or if it breaks down. This information can help the global computer system 507 to anticipate the lifespan of a part or a component and inform the storage and retrieval systems when the parts needs servicing in order to avoid complications and costly breakdowns of container handling vehicles on the grid or other components of the storage and retrieval system.

The global computer system 507 gathers information from a plurality of storage and retrieval systems in order to have as much foundation to base their evaluation and calculations on as possible. The information is what type of component or part, information regarding what type of problem, age of the component or part, the service time of the component, and the conditions it has been working in and any other information that can be of interest.

Based on this information the global computer system 507 can discover trends in regard to wear and tear on components. These trends help to indicate when a part or component needs servicing or changing.

The evaluation is for deciding which components that may have problems or not and if there are trends that they see in wear and tear.

Further the global computer centre receives information from production and testing 504. Production and testing 504 can provide information such as design flaws that effect the performance and durability of a components. Also, there can be information regarding if there are e.g. circuit boards that are faulty then the batch number and other information of interest can be collected by the production and testing 504 department.

Also, the global computer system 507 receives information from the service distributers 505 regarding what component has been repaired or changed together with when and where it has been changed.

The gathered information is analysed by the global computer system 507 in order to find out if there are any trends that is apparent regarding problems with components. The result of the analysis is sent to the central computer systems 503 of the storage and retrieval systems.

The central computer systems 503 can on the basis of the information sent from the global computer system 507 transfer the information to its service regime manager 506. The service regime manager 506 can be part of the central computer system 503, or it can be part of a separate service system, it can even be a separate standalone system independent of all the other systems that control and operate the storage and retrieval system. The service regime manager 506 creates a service regime based on the information.

The service regime controls when the parts and components of the storage grid are to be serviced. The service regime manager 506 is regularly updated with new information and hence the service regime is also updated with new information regarding what needs to be serviced and changed.

As an alternative to servicing or changing the component or part that shows signs of wear and tear, the worn component and the equipment it is attached to can be told to work with reduced working speed, e.g., to exert less load on the component or part. E.g. a container handling vehicle can be told to operate at reduced speed or to carry less weight, or to accelerate or decelerate slower. This ensures the best use of a component or part with both longevity and economy in mind.

In addition to this there can be sensors 501 attached around inside the building housing the storage and retrieval system in order to monitor the temperature and the humidity inside the building. This allows the system to monitor if there are certain temperatures or humidity ranges that causes more wear and tear of the components.

Figure 6:
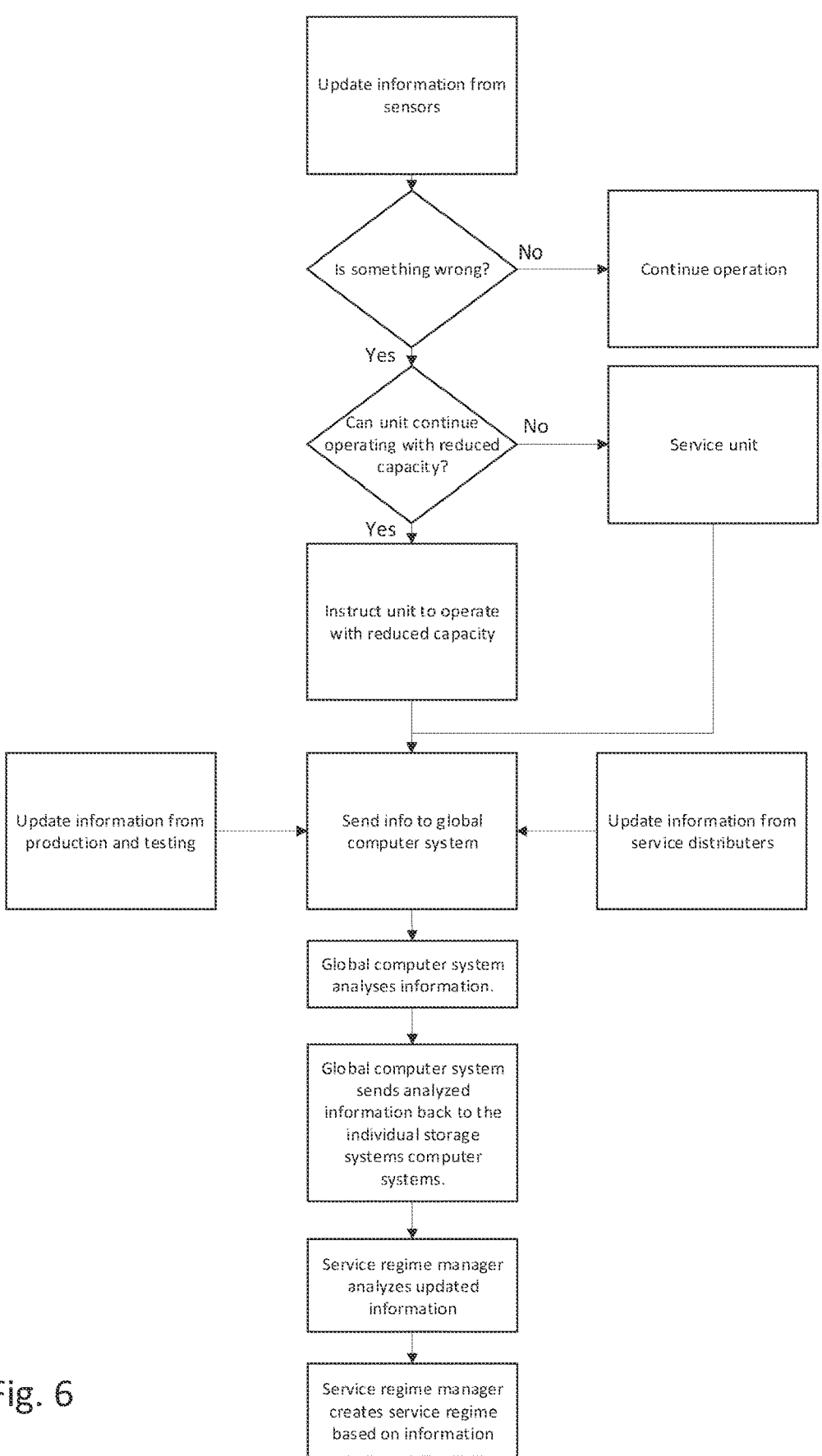
FIG. 6 is a flow chart of an exemplary step-by-step process of an embodiment of the present invention.

FIG. 6 is a flow chart of an exemplary step-by-step process of an embodiment of the present invention.

The sensors 501 transmit information regarding the condition of the components. This information is transmitted to either a central computer system 503 or a local service station 502 that is part of the storage and retrieval system of the component.

If something is wrong, then it is evaluated if the part can continue operating with reduced capacity or not. If not, the component or part is serviced or changed.

The central computer system 503 or the local service station 502 analyses the info and sends it to a global database. The global database collects information from a plurality of different storage and retrieval systems. Further, information is also gathered from production and testing 504 facilities and from service distributers 505 that handles the repairs and maintenance on the storage and retrieval systems.

The global database gathers all this information and analyses it. On the basis of this analysis information regarding the different components is sent back to the central computer system 503 or the local service station 502. The central computer system 503 or the local service station 502 sends the information to the service regime manager 506 that analyses the information and creates a service regime based on the information. The service regime is sent to the central computer system 503 or the local service station 502.

The service regime comprises information regarding which components to change and which components to service and when to do it.

The service regime is updated regularly since information from the sensors 501 and the production and testing 504 facilities and the service distributors 505 are regularly fed into the system.

In an alternative solution the information gathered from the sensors 501 and local service station 502 can be analysed locally and the information from the service distributors 505 and the production and testing 504 facilities is fed into each storage and retrieval system. The service regime manager 506 then creates a service regime from the information gathered from the storage and retrieval system it is monitoring. Information from the other systems is not or generally not used for as a basis for the service regime.

The present invention can also be used to estimate the condition of the grid. The grid can be estimated down to each individual column level. If there is a problem in one of the columns this will be indicated in the condition estimate for the column in question. The system can use this information to reduce the wear and tear on the container handling vehicles. If there is an alternative container that can be used, then the container handling vehicle can be sent to get the alternative container. If there is not an alternative container, then the container handling vehicle can be told to reduce the speed the container is being lifted with. If there are columns, or a series of columns that indicate a problem, then the container handling vehicles can be directed to go around the affected columns or they can be told to use reduced speed when driving in the affected areas.

The containers are subject to a lot of wear and tear. There are a lot of wear and tear when they are lifted and lowered into the columns and they are also subject to a lot of static pressure since they are stacked on top of each other in the columns. Also, the content of the containers can be a problem due to movement of the items in the container when they are being handled. If it is indicated that there are problems with a container, then the system can choose an alternative container if possible. If the conditions of a container drop from good to bad quickly then the system can indicate an inspection of the container. This can be done via a camera mounted on a container handling vehicle. Alternatively, the container can be sent to a port for inspection by an operator. Even further the container in question can be placed where in an area where there is little activity in order to reduce the number of times it is moved. A bad container can be placed on the top of a column that is not used much. Also, it is possible to place several bad containers in one area in order to minimalize the effect bad containers has on the efficiency of the automated storage and retrieval system.

If it is indicated that a port has a problem, then the central computer system can reduce the workload of the port that indicate a problem.

The communication system can also be monitored. If it is registered an area where there is bad communication due to a lot of incorrect transmissions the service system can indicate that the communication equipment in that area is malfunctioning and needs either a service or to be changed. This can also be an indication that there is something interrupting the radiocommunication in that part of the automated storage and retrieval system. by using condition-based estimation it is possible to address the problems with the radio.

Even the chargers can be monitored, if a charger shows indication of degraded performance, like e.g. if it uses longer time to charge the batteries of a container handling vehicle, condition-based maintenance can be used to indicate the need for maintenance. In a charger it can be dust in the filters that is the reason for a charger not charging at full effect.

Further the chargers have connecting points. The container handling vehicles attach to these connecting points if they need to recharge their batteries. When they have finished charging, they detach themselves from the connecting points. Both the charging stations and the container handling vehicles have connecting points that connect when charging. The container handling vehicles use power from the electro motors in order to manoeuvre to attach or detach from the charging station. The attaching and detaching of several container handling vehicles from the charging stations during a day will eventually cause wear on the charging point. Both the connecting points of the container handling vehicle and the connecting points of the chargers are exposed to wear. However, since there normally are more container handling vehicles than chargers there are more wear on the chargers than the container handling vehicles.

A method for checking if the connecting points on either the container handling vehicles or the connecting points on the chargers are worn to a point where they need to be changed. The container handling vehicle can measure how much power and torque needed to detach from the charger. If the container handling vehicle has to use power or torque over a pre-set threshold level the container handling vehicle can try to attach and detach from a different charger in order to decide if it is the connecting points on the chargers or the connecting points of the container handling vehicle that needs to be changed.

The container handling vehicle can then give information to the central computer system if the connecting points of the container handling vehicle needs to be changed or if one of the connecting points of the chargers needs to be changed. This solution makes it possible for the system to have continuous surveillance of the connecting points of both the chargers and the container handling vehicle.

Sensors on the batteries can indicate that the charging capacity of the batteries is reduced. Examples can be that the batteries are not capable to be charged up completely or that the charge level drops fast during use. During busy periods, like Christmas and Black Friday, reduced effect of batteries will affect all round performance of the storage and retrieval system greatly.

The storage and retrieval system can use machine learning in order to process the vast amounts of data and to see connections that a regular computer system is not capable of catching.

The local computer system can control which container handling vehicles or other parts of the storage and retrieval system that are used in order to reduce the risk of break down or reduced capacity or a crash between the container handling vehicles. Further if there are problems with the grid structure, the part of the grid structure with the problem can be closed down or blocked of in order to ensure that the grid is not further destroyed.

Also, if a container handling vehicle needs maintenance the container handling vehicle can be told to collect a container with spare parts before it goes to the maintenance area. If there are more than one container handling vehicle that needs maintenance, one of the container handling vehicles can be used to get a container with spare parts before they are sent to the maintenance area.

In the preceding description, various aspects of the delivery vehicle and the automated storage and retrieval system according to the invention have been described with reference to the illustrative embodiment. For purposes of explanation, specific numbers, systems, and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-6)

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (Xk)
301c Drive means in second direction (Y)
304 Gripping device
401 Delivery vehicle
402 Delivery vehicle drive means/wheel arrangement, 1. direction
403 Delivery vehicle drive means/wheel arrangement, 2. direction 500 Control system
501 Sensors
502 Local service station
503 Central computer system
504 Production and testing
505 Service distributers
506 Service regime manager
507 Global computer system
X First direction
Y Second direction
Z Third direction

The invention claimed is:

1. A maintenance management system for condition-based maintenance, the maintenance management system comprising at least an storage and retrieval system comprising a framework structure with a rail system forming a three-dimensional storage grid structure for storing a plurality of storage containers for storing items, where the grid structure forms vertical storage columns having a horizontal area defined by size of an access opening between rails of the rail system that are arranged on the framework structure, the rail system providing available routes for container handling vehicles handling and transferring the plurality of storage containers to and from the storage columns, at least one container handling vehicle which has a container handling platform with a set of grippers for handling the plurality of storage containers, the grid structure comprising one or more ports for extracting the plurality of storage containers from the storage grid so that the plurality of storage containers are adapted to be picked and a service station for performing maintenance on a plurality of components of the storage and retrieval system, wherein the storage and retrieval system comprises a plurality of sensors attached to the plurality of components of the storage and retrieval system for providing the condition-based information linked to parts and the plurality of components of the storage and retrieval system and wherein the maintenance management system further comprises:

a service regime manager comprising at least one processor configured to retrieve the condition-based information from the plurality of sensors and create a service regime based on the condition-based information linked to the parts and the plurality of components of the storage and retrieval system and send the service regime to a local service station where condition-based maintenance is performed, wherein the service regime controls at least when the parts and/or plurality of components are to be repaired or replaced, and the maintenance management system further comprising:

a central computer system comprising at least one processor and memory storing instructions which, when executed, are configured to:

receive and analyze the condition-based information from the plurality of sensors and determine which of the condition-based information is to be sent to a global computer system for condition-based maintenance, and further sending only the condition-based information having a potential interest to other storage and retrieval systems, the global computer system comprising at least one processor configured to receive the condition-based information from the central computer system, determine one or more trends regarding component servicing or changing of components, and further transfer information relating to the one or more trends to the central computer system's service regime manager.

2. The maintenance management system according to claim 1, wherein the at least one container handling vehicle has at least one rechargeable power source, and the maintenance management system has at least one charging device for charging the rechargeable power sources of the container handling vehicles.

3. The maintenance management system according to claim 1, further comprising production and testing facilities, service distributers, wherein the global computer system is configured to collect information from the central computer systems of each of the storage and retrieval system, the production and testing facilities, and the service distributers, and analyze and send collected information back to the central computer systems of each of the storage and retrieval system.

4. The maintenance management system according to claim 1, wherein the sensors comprise temperature and/or humidity sensors.

5. The maintenance management system according to claim 1, wherein a service centre is configured to record and store a data record if a component of the plurality of components breaks down, where the data record comprises information relating to the component, service time and/or age thereof.

6. The maintenance management system according to claim 1, wherein the at least one container handling vehicle has a worn component and is adapted to adjust speed, acceleration, and deceleration to suit the worn component's condition by the central computer system.

7. The maintenance management system according to claim 1, wherein the container handling platform of the at least one container handling vehicle has sensors for detecting if a storage container of the plurality of storage containers meets resistance or becomes stuck in a storage container column of the storage and retrieval system.

8. A method for condition-based maintenance of an automated storage and retrieval system comprising a framework structure with a rail system forming a three-dimensional storage grid structure for storing a plurality of storage containers for storing items, where the grid structure forms vertical storage columns having a horizontal area defined by size of an access opening between rails of the rail system that are arranged on the framework structure, the rail system providing available routes for container handling vehicles handling and transferring the plurality of storage containers to and from the storage columns, at least one container handling vehicle, and a container handling platform with a set of grippers for handling the plurality of storage containers, the grid structure comprising one or more ports for extracting the plurality of storage containers from the storage grid so that the plurality of storage containers are adapted to be picked and a service station for performing maintenance on a plurality of components of the storage and retrieval system and wherein the method comprises:

gathering, by at least one processor, sensor information from sensors which are monitoring the plurality of components of the storage and retrieval system,
   monitoring, by a central computer system, condition of the plurality of components of the storage and retrieval system, sending, by the central computer system, information regarding the condition of components of the storage and retrieval system to the central computer system,
   sending, by the central computer system, only condition-based information having a potential interest to other storage and retrieval systems from the central computer system to a global computer system,
   analyzing, by a service regime manager, the information regarding the condition of components of the storage and retrieval system to generate analysed information,
   creating, by the service regime manager, a service regime based on the analysed information regarding the condition of components of the storage and retrieval system, wherein the service regime controls at least when parts and/or the plurality of components are to be repaired or replaced,
   sending, by the service regime manager, the service regime to at least one service station,
   performing, by the service station, condition-based maintenance if needed,
   determining, by the global computer system, one or more trends regarding component servicing or changing based on the information regarding the condition of components of the storage and retrieval system, and
   sending, by the global computer system, information relating to a trend of the one or more trends to the central computer system's service regime manager for updating the service regime.

9. The method according to claim 8, wherein the sensor information comprises a registration of a problem with the component of the storage and retrieval system together with information regarding its service time and age.

10. The method according to claim 8, further comprises identifying that the at least one container handling vehicle has a worn component, and allocating the at least one container handling vehicle to tasks requiring reduced workload on a task list.

11. The method according to claim 10, wherein the method comprises adapting speed, acceleration, and deceleration of the at least one container handling vehicle based on a predetermination of the worn component.

12. The method according to claim 8, wherein the method comprises having sensors attached to the grippers of the container handling platform of the at least one container handling vehicle for detecting when a storage container of the plurality of storage containers gets stuck in a storage container column of the storage and retrieval system.

13. The method according to claim 8, wherein the method comprises updating, by the at least the processor, production and testing information from production and testing facilities and sending the production and testing information to the central computer system.

14. The method according to claim 8, wherein the method comprises updating, by the at least the processor, service distributor information from service distributors and sending the service distributor information to the central computer system.

\* \* \* \* \*